(12) United States Patent
Arora et al.

(10) Patent No.: US 7,790,320 B2
(45) Date of Patent: Sep. 7, 2010

(54) BATTERY SEPARATOR WITH Z-DIRECTION STABILITY

(75) Inventors: Pankaj Arora, Charlotte, NC (US); Ronald W. Call, Rock Hill, SC (US); Tien Dao, Charlotte, NC (US); Khuy V. Nguyen, Charlotte, NC (US); Donald K. Simmons, Charlotte, NC (US); Zhengming Zhang, Charlotte, NC (US)

(73) Assignee: Celgard LLC, Charlotte, NC (US)

( * ) Notice: Subject to any disclaimer, the term of this patent is extended or adjusted under 35 U.S.C. 154(b) by 0 days.

(21) Appl. No.: 11/619,002

(22) Filed: Jan. 2, 2007

(65) Prior Publication Data

US 2007/0105019 A1    May 10, 2007

Related U.S. Application Data

(62) Division of application No. 10/971,310, filed on Oct. 22, 2004, now abandoned.

(51) Int. Cl.
*H01M 2/16* (2006.01)
*H01M 2/14* (2006.01)

(52) U.S. Cl. ............... 429/247; 429/129; 429/248; 429/249; 429/251

(58) Field of Classification Search ............... 429/247, 429/251, 129, 248, 249
See application file for complete search history.

(56) References Cited

U.S. PATENT DOCUMENTS

| 4,650,730 A | * | 3/1987 | Lundquist et al. ............ 429/62 |
| 4,849,144 A | * | 7/1989 | McLoughlin ............... 264/45.9 |
| 6,432,586 B1 | | 8/2002 | Zhang |

FOREIGN PATENT DOCUMENTS

WO    WO 0191219    11/2001

* cited by examiner

*Primary Examiner*—Patrick Ryan
*Assistant Examiner*—Julian Mercado
(74) *Attorney, Agent, or Firm*—Hammer & Associates, P.C.

(57) ABSTRACT

A battery separator is a microporous membrane. The membrane has a major volume of a thermoplastic polymer and a minor volume of an inert particulate filler. The filler is dispersed throughout the polymer. The membrane exhibits a maximum Z-direction compression of 95% of the original membrane thickness. Alternatively, the battery separator is a microporous membrane having a TMA compression curve with a first substantially horizontal slope between ambient temperature and 125° C., a second substantially horizontal slope at greater than 225° C. The curve of the first slope has a lower % compression than the curve of the second slope. The curve of the second slope is not less than 5% compression. The TMA compression curve is graphed so that the Y-axis represents % compression from original thickness and the X-axis represents temperature.

3 Claims, 1 Drawing Sheet

BATTERY SEPARATOR WITH Z-DIRECTION STABILITY

RELATED U.S. PATENT APPLICATION

The instant application is a divisional application claiming the benefit of U.S. application Ser. No. 10/971,310 filed Oct. 22, 2004, now abandoned.

BACKGROUND OF THE INVENTION

The use of microporous membranes as battery separators is known. For example, microporous membranes are used as battery separators in lithium-ion batteries. Such separators may be single layered or multi-layered thin films made of polyolefins. These separators often have a 'shut-down' property such that when the temperature of the battery reaches a predetermined temperature, the pores of the membrane close and thereby prevent the flow of ions between the electrodes of the battery. Increasing temperature in the battery may be caused by internal shorting, i.e., physical contact of the anode and cathode. The physical contact may be caused by, for example, physical damage to the battery, damage to the separator during battery manufacture, dendrite growth, excessive charging, and the like. As such, the separator, a thin (e.g., typically about 8-25 microns thickness) microporous membrane, must have good dimensional stability.

Dimensional stability, as it applies to battery separators, refers to the ability of the separator not to shrink or not to excessively shrink as a result of exposure to elevated temperatures. This shrinkage is observed in the X and Y axes of the planar film. This term has not, to date, referred to the Z-direction dimensional stability.

Puncture strength, as it applies to battery separators, is the film's ability to resist puncture in the Z-direction. Puncture strength is measured by observing the force necessary to pierce a membrane with a moving needle of known physical dimensions.

To date, nothing has been done to improve the Z-direction dimensional stability of these battery separators. Z-direction refers to the thickness of the separator. A battery is tightly wound to maximize its energy density. Tightly winding means, for a cylindrically wound battery, that forces are directed radially inward, causing a compressive force on the separator across its thickness dimension. In the increasing temperature situation, as the material of the separator starts to flow and blind the pores, the electrodes of the battery may move toward one another. As they move closer to one another, the risk of physical contact increases. The contact of the electrodes must be avoided.

Accordingly, there is a need for a battery separator, particularly a battery separator for a lithium-ion battery, having improved Z-direction stability.

In the prior art, it is known to mix filler into a separator for a lithium battery. In U.S. Pat. No. 4,650,730, a multi-layered battery separator is disclosed. The first layer, the 'shut down' layer, is an unfilled microporous membrane. The second layer, the dimensionally stable layer, is a particulate filled microporous layer. The second layer, in final form (i.e., after extraction of the plasticizer), has a composition weight ratio of 7-35/50-93/0-15 for polymer/filler/plasticizer. There is no mention of Z-direction dimensional stability; instead, dimensional stability refers to the length and breadth dimensions of the separator. The filler is used as a processing aid so that the high molecular weight polymer can be efficiently extruded into a film. In U.S. Pat. No. 6,432,586, a multi-layered battery separator for a high-energy lithium battery is disclosed. The separator has a first microporous membrane and a second nonporous ceramic composite layer. The ceramic composite layer consists of a matrix material and inorganic particles. The matrix material may be selected from the group of polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof and mixtures thereof. The inorganic particles may be selected from the group of silicon dioxide ($SiO_2$), aluminum oxide ($Al_2O_3$), calcium carbonate ($CaCO_3$), titanium dioxide ($TiO_2$), $SiS_2$, $SiPO_4$, and the like. The particulate makes up about 5-80% by weight of the ceramic composite layer, but most preferably 40-60%. There is no mention of Z-direction stability, and the particulate is chosen for its conductive properties.

SUMMARY OF THE INVENTION

A battery separator is a microporous membrane. The membrane has a major volume of a thermoplastic polymer and a minor volume of an inert particulate filler. The filler is dispersed throughout the polymer. The membrane exhibits a maximum Z-direction compression of 95% of the original membrane thickness. Alternatively, the battery separator is a microporous membrane having a TMA compression curve with a first substantially horizontal slope between ambient temperature and 125° C., a second substantially horizontal slope at greater than 225° C. The curve of the first slope has a lower % compression than the curve of the second slope. The curve of the second slope is not less than 10% compression. The TMA compression curve is graphed so that the Y-axis represents % compression from original thickness and the X-axis represents temperature.

DESCRIPTION OF THE DRAWINGS

For the purpose of illustrating the invention, there is shown in the drawing information about the preferred embodiment of the invention; it being understood, however, that this invention is not limited to the precise information shown.

DESCRIPTION OF THE INVENTION

Figure 1:
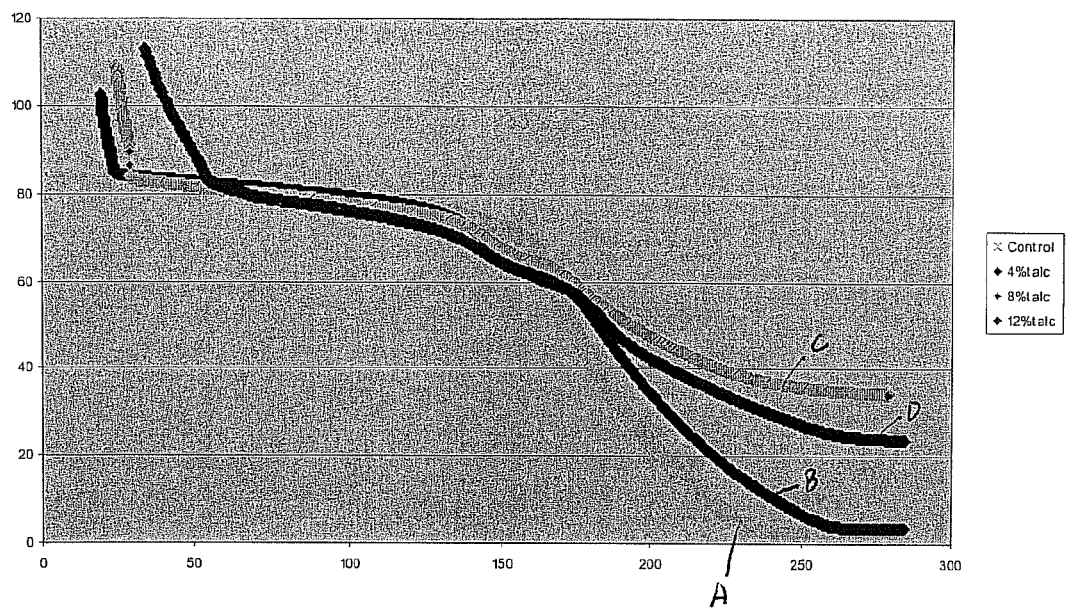
FIG. 1 is a graphical illustration of TMA compression curves for several differing membranes.

A battery separator, as used herein, refers to a thin, microporous membrane that is placed between the electrodes of a battery. It physically separates the electrodes to prevent their contact, allows ions to pass through the pores between the electrodes during discharging and charging, acts as a reservoir for the electrolyte, and may have a 'shut down' function. Hereinafter, discussion of the battery separator shall be made with reference to lithium-ion batteries, it being understood, however, that the separator is not so limited.

Microporous membranes typically have porosities in the range of 20-80%, alternatively in the range of 28-60%. The average pores size is in the range of 0.02 to 2.0 microns, alternatively in the range of 0.04 to 0.25 microns. The membrane has a Gurley Number in the range of 5 to 150 sec, alternatively 20 to 80 sec (Gurley Numbers refers to the time it takes for 10 cc of air at 12.2 inches of water to pass through one square inch of membrane). The membrane may range in thickness from about 0.1 to 75 microns, alternatively 8 to 25 microns. Membranes may be single layered or multi-layered. In multi-layered membranes, at least one of the membranes will included the filler discussed in greater detail below. A multi-layered separator may have three layers where the filled layer is sandwiched between two other layers or two-filled layer may sandwich another membrane. Other layer, as used herein, refers to any layer, including coatings, other than the inventive layer. Other configurations are readily apparent to one of ordinary skill.

Thermoplastic polymer generally refers to any synthetic thermoplastic polymer that softens when heated and returns to its original condition when cooled. Such thermoplastic polymers include: polyolefins, polyvinyl chlorides, nylons, fluorocarbons, polystyrenes, and the like. Of the thermoplastics, polyolefins are the most interesting. Polyolefins include, but are not limited to, polyethylene, ultra high molecular weight polyethylene (not considered a thermoplastic by some, but included herein nevertheless), polypropylene, polybutene, polymethylpentene, polyisoprene, copolymers thereof, and blends thereof. Exemplary blends include, but are not limited to, blends containing two or more of the following polyethylene, ultra high molecular weight polyethylene, and polypropylene, as well as, blends of the foregoing with copolymers such as ethylene-butene copolymer and ethylene-hexene copolymer.

A major volume of thermoplastic polymer refers to a majority by volume of the membrane being the polymer. A majority is greater than 50%, alternatively, 50 to 90%.

Inert particulate filler refers to any material that when uniformly blended into the foregoing thermoplastic polymer does not interact nor chemically react with the thermoplastic polymer to substantially alter its fundamental nature and will not, when used as a component of the membrane of a battery separator, have an adverse impact upon the chemistry of the battery. This filler may be any material that is thermally stable, i.e., maintains or substantially maintains its physical shape at temperatures above, for example, 200° C. Particulate most often refers to a small bead or grain, but may also describe a flat or planar object or a rod or fiber like object. The filler is small, and by small is meant an average particle size in the submicron (less than 1 micron) range with a maximum particle size no larger than 40% of the membrane layer thickness, alternatively no larger than 10% of the layer's thickness. In some applications (e.g., when making membranes with a thickness of about 1 micron or less), filler with nano-sized average particle sizes is beneficial.

Inert particulate filler may be selected from the following group of materials: carbon based materials, metal oxides and hydroxides, metal carbonates, minerals, synthetic and natural zeolites, cements, silicates, glass particles, sulfur-containing salts, synthetic polymers, and mixtures thereof. Exemplary carbon based materials include: carbon black, coal dust, and graphite. Exemplary metal oxides and hydroxides include those having such materials as silicon, aluminum, calcium, magnesium, barium, titanium, iron, zinc, and tin. Specific examples include: $TiO_2$, $MgO$, $SiO_2$, $Al_2O_3$, $SiS_2$, $SiPO_4$. Exemplary metal carbonates include those having such materials as: calcium and magnesium. Specific examples include: $CaCO_3$. Exemplary minerals include: mica, montmorillonite, kaolinite, attapulgite, asbestos, talc, diatomaceous earth, and vermiculite. Exemplary cements include: portland cement. Exemplary silicates include: precipitated metal silicates (e.g., calcium silicate and aluminum polysilicate), fumed silica, and alumina silica gels. Exemplary sulfur-containing salts include: molybdenum disulfide, zinc sulfide, and barium sulfate. Exemplary synthetic polymers include: polytetrafluoroethylene (PTFE), polyimide (PIM), polyesters (e.g., polyethylene terephthalate (PET)).

A minor volume of inert particulate filler refers to a minority by volume of the membrane being the filler. A minority is less than 50%, alternatively 1-50%, or 5-45%.

The foregoing membranes may be made by any conventional process. The two most widely used processes for making microporous membranes for battery separators are know as the dry-stretch (or Celgard) process and the wet (or extraction or TIPS) process. The major difference between these processes is the method by which the microporous structure is formed. In the dry-stretch process, the pore structure is formed by stretching. In the wet process, the pore structure is formed by the extraction of a component. Both processes are similar in that the material components are mixed, typically in an extruder or via master-batching, and then formed into a thin film precursor before pore formation.

The present invention may be manufactured by either process, so long as the inert particulate filler is uniformly mixed into the thermoplastic polymer prior to extrusion of the precursor.

In addition to the above combination of thermoplastic polymer and particulate filler, the mixture may include conventional stabilizers, antioxidants, additives and processing aids as known to those skilled in the art.

TMA (thermal mechanical analysis) measures the mechanical response of a polymer system as the temperature changes. The compression TMA measures the loss of thickness of a film when a constant force is applied in the Z-direction to the film as a function of increasing temperature. In this test, a mechanical probe is used to apply a controlled force to a constant area of the sample as the temperature is increased. The movement of the probe is measured as a function of temperature. The compression TMA is used to measure the mechanical integrity of the film.

A standard TMA machine (Model No. TMA/SS/150C, Seiko Instruments Inc., Paramus, N.J.) with a probe (quartz cylindrical probe, 3 mm diameter) is used. The load on the probe is 125 g. The temperature is increased at the rate of 5° C./min. The film sample size is a single film with the dimensions of 5×5 mm.

Figure 2:
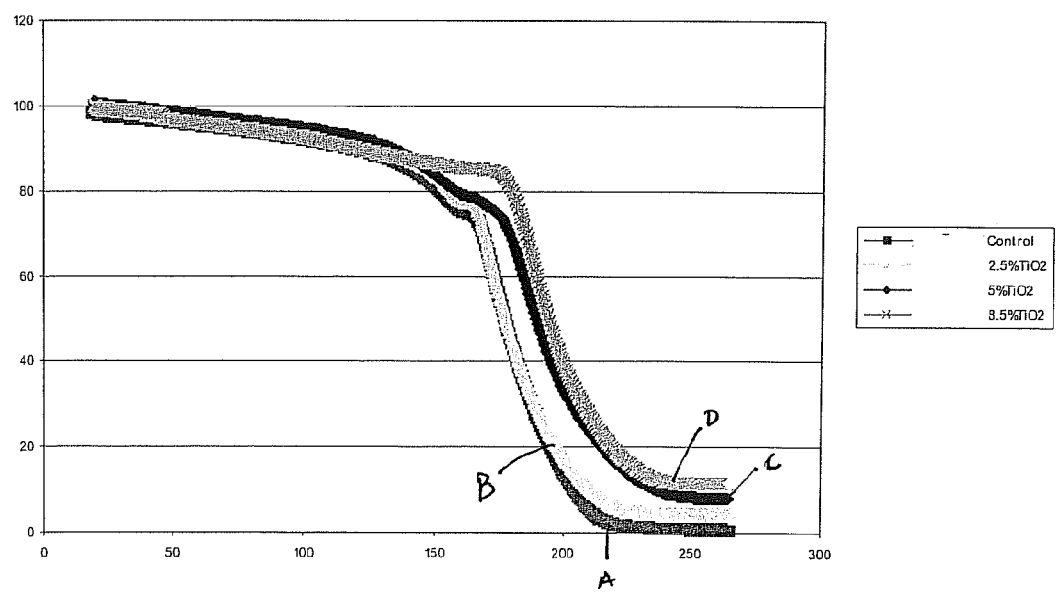
FIG. 2 is a graphical illustration of TMA compression curves for several differing membranes.

In FIGS. 1 and 2, the X-axis represents temperature and the Y-axis represents % TMA. % TMA is percentage reduction in thickness of the membrane as a result of increasing temperature. For example, at 0° C., the membrane's thickness is 100% under the specified load. In the instant membrane, a maximum compression of 95% (or 5% of the original thickness) is suitable to prevent electrode contact.

Referring to FIG. 1, there is shown four (4) TMA compression curves of four different membranes. Each membrane is a microporous membrane of polypropylene. Curve A is the control (i.e., no filler). Curve B has 4% by volume talc. Curve C has 8% talc. Curve D has 12% talc. Note that the control has a maximum compression of 100% at 250° C., whereas Curves C and D never cross the 80% compression lines.

Referring to FIG. 2, there is shown four (4) TMA compression curves of four different membranes. Each membrane is a microporous membrane of polypropylene. Curve A is the control (i.e., no filler). Curve B has 2.5% by volume $TiO_2$. Curve C has 5% $TiO_2$. Curve D has 8.5% $TiO_2$. Note that the control has a maximum compression of 100% at 250° C., whereas Curve B has a maximum compression of about 95% and Curves C and D have a maximum compression of about 90%.

The present invention may be embodied in other forms without departing from the spirit and the essential attributes thereof, and, accordingly, reference should be made to the appended claims, rather than to the foregoing specification, as indicated the scope of the invention.

We claim:
1. A method of providing a battery separator with Z-direction stability for a lithium-ion battery comprising the step of:
   providing a microporous membrane comprising a thermoplastic polymer being selected from the group consisting of: polyethylene, polypropylene, polybutene, polymethylpentene, ultrahigh molecular weight polyethylene, copolymers thereof, and blends of the foregoing, and 10-30 weight percent of an inert particulate filler, said inert particulate filler being selected from the group consisting of: carbon based materials, metal oxides and hydroxides, calcium and magnesium carbonates, minerals, synthetic and natural zeolites, cements, silicates, glass particles, molybdenum disulfide, zinc sulfide, barium sulfate, synthetic polymers, and mixtures thereof, and said inert particulate filler being dispersed throughout said polymer.

2. The method of claim 1 wherein said membrane exhibits a maximum Z-direction compression of 85% of the original membrane thickness.

3. A method for providing Z-direction stability to a battery separator for a lithium-ion battery comprising the step of:
   providing a microporous membrane comprising a thermoplastic polymer being selected from the group consisting of: polyethylene, polypropylene, polybutene, polymethylpentene, ultrahigh molecular weight polyethylene, copolymers thereof, and blends of the foregoing, and 10-30 weight percent of an inert particulate filler, said inert particulate filler being selected from the group consisting of: carbon based materials, metal oxides and hydroxides, calcium and magnesium carbonates, minerals, synthetic and natural zeolites, cements, silicates, glass particles, molybdenum disulfide, zinc sulfide, barium sulfate, synthetic polymers, and mixtures thereof, and said inert particulate being dispersed throughout said polymer, and said membrane having a TMA compression curve with a first substantially horizontal slope between ambient temperature and 125° C., a second substantially horizontal slope at greater than 225° C., wherein a Y-axis represents % compression from original thickness and a X-axis represents temperature, said curve of said first slope having a lower % compression than said curve of said second slope, and said curve of said second slope not being less than 5% compression.

* * * * *